United States Patent [19]
Miesak

[11] Patent Number: 5,487,121
[45] Date of Patent: Jan. 23, 1996

[54] OPTICAL SIGNAL COUPLING APPARATUS

[75] Inventor: Edward J. Miesak, Orlando, Fla.

[73] Assignee: University of Central Florida, Orlando, Fla.

[21] Appl. No.: 359,702

[22] Filed: Dec. 20, 1994

[51] Int. Cl.$^6$ ........................................ G02B 6/26
[52] U.S. Cl. ........................................ 385/39
[58] Field of Search ........................ 385/27, 30, 31, 385/39, 42, 47, 50, 69, 77, 85, 72

[56] References Cited

U.S. PATENT DOCUMENTS

| | | | |
|---|---|---|---|
| 4,266,851 | 5/1981 | Salisbury | 385/39 |
| 4,315,666 | 2/1982 | Hicks, Jr. | 385/39 X |
| 4,441,784 | 4/1984 | Korth | 385/39 |
| 4,469,397 | 9/1984 | Herbert et al. | 385/27 |
| 4,530,097 | 7/1985 | Stockes et al. | 385/30 |
| 4,682,848 | 7/1987 | Cairns et al. | 385/69 |
| 4,775,214 | 10/1988 | Johnson | 385/39 X |
| 4,834,493 | 5/1989 | Cahill et al. | 385/77 |
| 5,218,655 | 6/1993 | Mizrahi | 385/39 |
| 5,325,450 | 6/1994 | Suganuma et al. | 385/39 |
| 5,384,871 | 1/1995 | Devenyi | 385/39 X |

*Primary Examiner*—Akm E. Ullah
*Attorney, Agent, or Firm*—James H. Beusse

[57] ABSTRACT

An optical coupler is provided which includes a transmitter optical cable which is machined along its length to have a substantially flat, smooth lower surface. The transmitter optical cable includes a curved upper surface on which a cladding layer is situated for containing an optical signal which is provided to an input end of the transmitter optical cable. A receiver optical cable is similarly machined to include a substantially flat, smooth upper surface and a curved lower surface on which a cladding layer is situated. The flat lower surface of the transmitter optical cable and the flat upper surface of the receiver optical cable are oriented in generally parallel, spaced apart relationship with an index matching member being situated therebetween. An incident optical signal enters the input end of the transmitter optical cable, exits the lower surface thereof, enters the index matching member and the upper surface of the receiver optical cable, and exits the output end thereof. In this manner, the transmitter optical cable is permitted to move rotationally, or alternatively, linearly, with respect to the receiver optical cable.

14 Claims, 4 Drawing Sheets

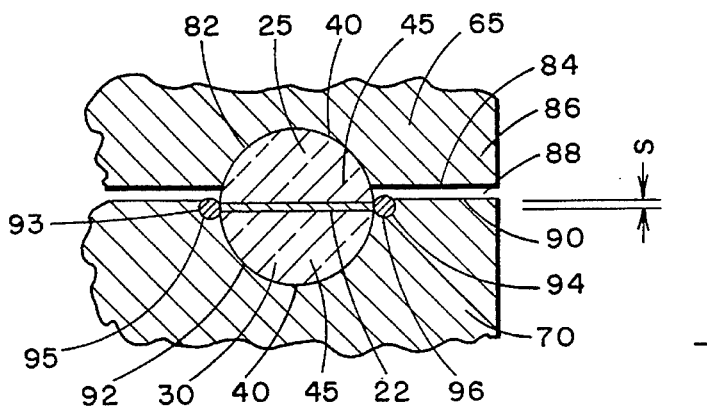
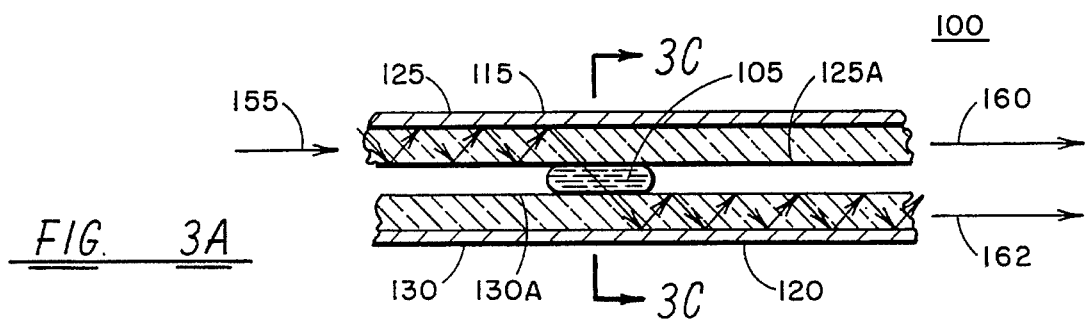
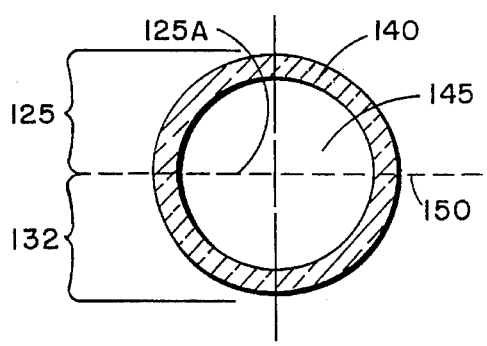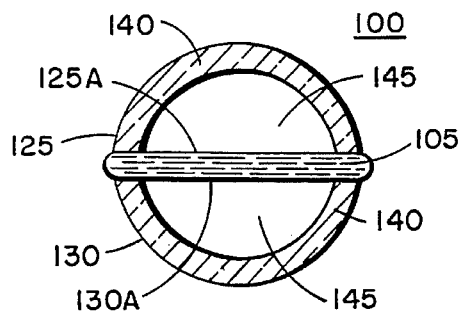
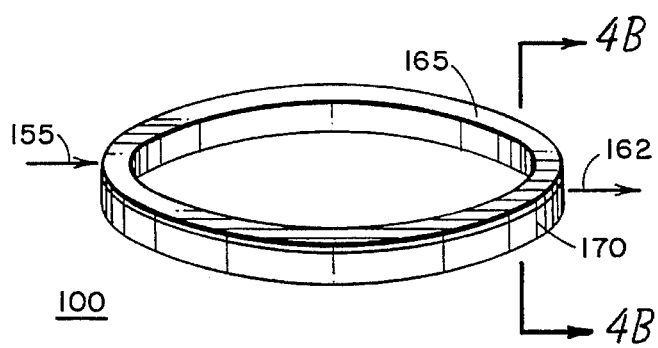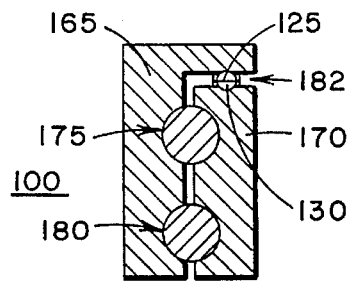

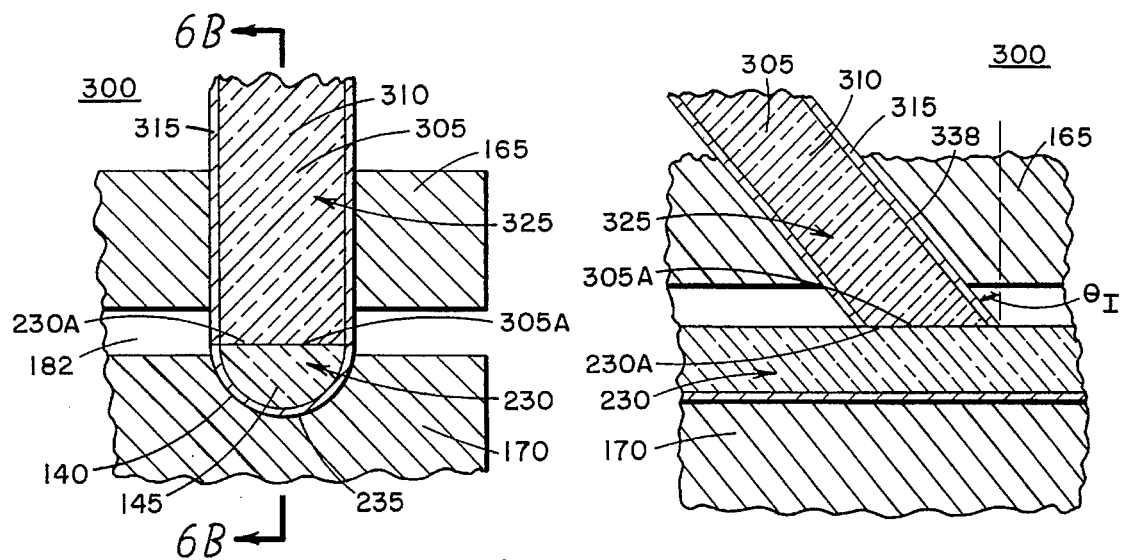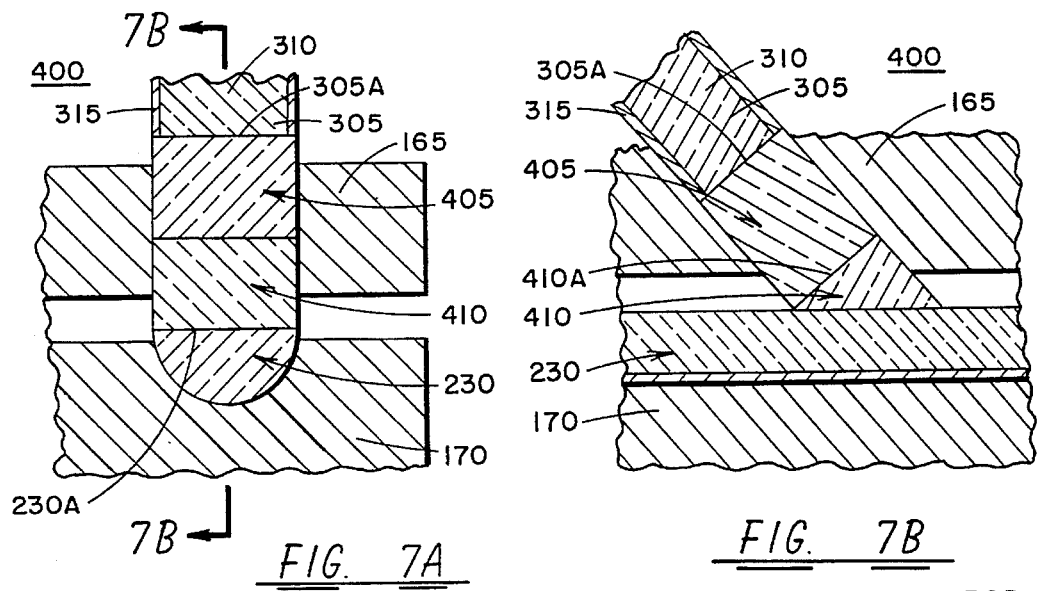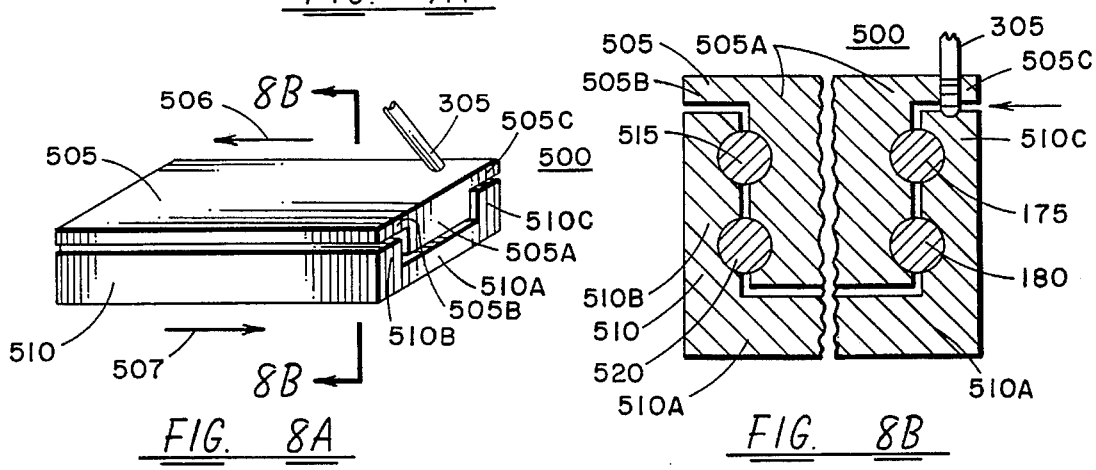

OPTICAL SIGNAL COUPLING APPARATUS

BACKGROUND OF THE INVENTION

As optical signal and opto-electronic communications have come into prominence in recent years, numerous optical couplers have been devised to couple one fiber-optic cable to another. Generally these couplers have been directed to coupling two stationary cables together. However, more recently, the need to couple moving fiber-optic cables together has come into being. In response to this need, devices such as the Fiber Optic Rotating Joint (FORJ) have been developed. In a FORJ coupler, an optical fiber such as that used in communications, is coupled through a rotating joint to another optical fiber. In this manner, one of the optical fibers can move or pivot while the other remains stationary. One illustrative use of such a FORJ coupler is on military tanks wherein a FORJ coupler is mounted on the base of the rotating turret to maintain communications with the body of the tank. An example of one FORJ coupler is the "Off-Axis FORJ" which is available from Litton Poly-Scientific.

One problem encountered in FORJ coupler design is significant signal loss as the signal is transmitted through the FORJ device. Another problem encountered in FORJ devices is undesired wear and friction within the device as portions of the device rotate. Moreover FORJ couplers such as the one referenced above require digital data and need active electronics at the input and output of the coupler. Insertion loss of this FORJ coupler can be quite high, for example approximately 20 dB. The amplitude of the output signal can also vary significantly when this FORJ coupler is rotated.

SUMMARY OF THE INVENTION

Accordingly, one object of the present invention is to provide a fiberoptic rotating joint optical coupler which reduces signal loss as an optical signal is transmitted through the coupler.

Another object of the present invention is to provide a fiberoptic rotating joint optical coupler which reduces friction within the optical coupler.

In accordance with one embodiment of the present invention, an optical coupler is provided including a transmitter optical fiber member having a generally curved upper surface and a substantially flat lower surface running lengthwise along the transmitter optical fiber member. The transmitter optical fiber member also includes an input end. A first cladding layer is situated on the upper surface of the transmitter optical fiber member. The optical coupler further includes a receiver optical fiber member having a generally curved lower surface and a substantially flat upper surface running lengthwise along the receiver optical fiber member, the receiver optical fiber member including an output end. A second cladding layer is situated on the lower surface of the receiver optical fiber member, the flat surface of the receiver optical fiber member being oriented to face the flat surface of the transmitter optical fiber member in spaced apart relationship thereto. An index matching member is situated between the flat surface of the receiver optical fiber member and the flat surface of the transmitter optical fiber member. The index matching member couples light from the transmitter optical fiber member to the receiver optical fiber member while permitting the transmitter optical fiber member to move with respect to the receiver optical fiber member. In this manner, incident light which is supplied to the input end of the transmitter optical fiber member exits the flat surface of the transmitter optical fiber member, passes through the index matching member, enters the flat surface of the receiver optical fiber member and exits the output end of the receiver optical fiber member.

Another embodiment of the optical coupler includes a first annular member and a second annular member which is rotatably mounted to the first annular member. The coupler includes a transmitter optical fiber member which is coupled to the first annular member. The transmitter optical fiber member includes a first cladding layer for containing an optical signal provided thereto and a substantially flat lower surface through which the optical signal passes. The optical coupler further includes a receiver optical fiber member which is coupled to the second annular member. The receiver optical fiber member includes a second cladding layer for containing an optical signal provided thereto and a substantially flat upper surface through which the optical signal passes. An index matching member is situated between and in slidable contact with the lower surface of the transmitter optical fiber member and the upper surface of the receiver optical fiber member. This slidable index member couples the optical signal between the transmitter optical fiber member and the receiver optical fiber member while matching the indices of refraction of the transmitter and receiver optical fiber members.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

FIG. 2C is a close up view of the portion of optical coupler of FIG. 2B in which a transmitter and receiver portion are situated.

FIG. 3A is a simplified cross section of another optical coupler which is similar to the optical coupler of FIG. 1D except for a different index matching member.

FIG. 3B is a cross section of an optical fiber cable employed in fabricating the optical coupler of FIG. 3A.

FIG. 3C is a cross section of the optical coupler of FIG. 3A taken along section line 3C—3C.

FIG. 4A is a more detailed perspective view of the optical coupler of FIG. 3A.

FIG. 4B is a cross section of the optical coupler of FIG. 4A taken along section line 4B—4B.

FIG. 6A is a close up cross sectional view of the portion of another embodiment of the optical coupler which houses a transmitter and receiver portion.

FIG. 6B is a cross section of the optical coupler of FIG. 6A taken along section line 6B—6B.

FIG. 7A is a close up cross sectional view of the portion of another embodiment of the optical coupler which houses a transmitter and receiver portion.

FIG. 7B is a cross section of the optical coupler of FIG. 7A taken along section line 7B—7B.

FIG. 8A is a perspective view of another embodiment of the optical coupler of the invention which is adapted for linear translation motion.

FIG. 8B is a cross section of the optical coupler of FIG. 8A taken along section line 8B—8B.

DETAILED DESCRIPTION OF THE INVENTION

Figure 1A:
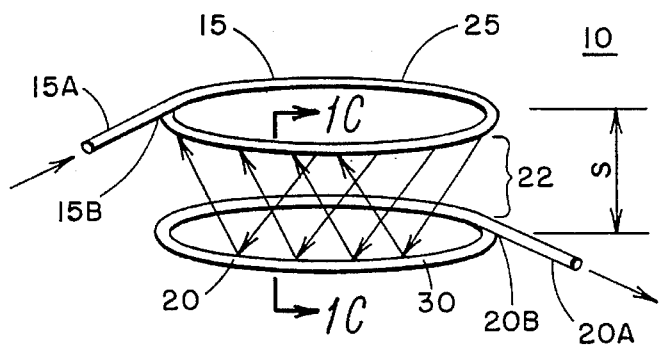
FIG. 1A is a simplified perspective representation of one embodiment of the optical coupler of the invention.

FIG. 1A shows a simplified representation of one embodiment of the optical coupler of the present invention as optical coupler 10. Coupler 10 is adapted for rotational motion and includes a transmitter optical fiber member 15 and a receiver optical fiber member 20. Transmitter and receiver optical fiber members 15 and 20 respectively include input 15A and output 20A, respectively. Transmitter optical fiber member 15 is situated in spaced apart relationship with respect to receiver optical fiber member 20, the distance between members 15 and 20 being designated, S. It is noted that FIG. 1A is not drawn to scale. In actual practice, members 15 and 20 are significantly closer together than shown in FIG. 1A. Also, in actual practice, an index matching fluid 22 is situated between, and in slidable contact with, members 15 and 20 within space S as described later.

As seen in FIG. 1A, a portion of transmitter optical fiber member 15 is wound to close on itself and forms a circular or ring-like transmitter portion 25. Transmitter portion 25 thus exhibits a generally annular geometry. Transmitter portion 25 closes on itself at end 15B. Similarly, a portion of receiver optical fiber member 20 is wound to close on itself and form a circular or ring-like receiver portion 30. Receiver portion 30 closes on itself at end 20B. Transmitter portion 25 and receiver portion 30 are vertically aligned. Transmitter portion 25 is rotatably mounted with respect to receiver portion 30 so as to permit rotation of transmitter portion 25 while receiver portion 30 remains stationary or vice versa.

Figure 1B:
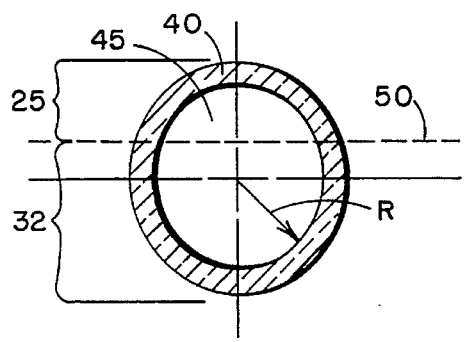
FIG. 1B is a cross section of an optical fiber cable employed in fabricating the optical coupler of FIG. 1A.

FIG. 1B is a cross section of a fiberoptic cable which may be used to fabricate transmitter optical fiber member 15 and receiver optical fiber member 20. The fiberoptic cable includes a cladding layer 40 which coaxially surrounds an inner fiberoptic core 45. The fiberoptic cable of FIG. 1B exhibits a radius of curvature, R, which is within the range of approximately 0.05 mm to approximately 0.5 mm in one embodiment. What is important in selecting the particular radius of curvature of the fiberoptic cable is that the particular radius selected be sufficiently large to permit accurate surface machining as discussed below. For example, a radius of approximately 0.5 mm or larger is found to be satisfactory. One type of fiber optical cable which may be employed as transmitter optical fiber member 15 and a receiver optical fiber member 20 is 1000 μm plastic core fiber optic cable available from Hewlett Packard.

To form the transmitter portion 25 of transmitter optical fiber member 15, the cable of FIG. 1B is cut along the dashed line 50. The lowermost portion of the cut cable thus formed is designated as discard portion 32 which is discarded.

Figure 1C:
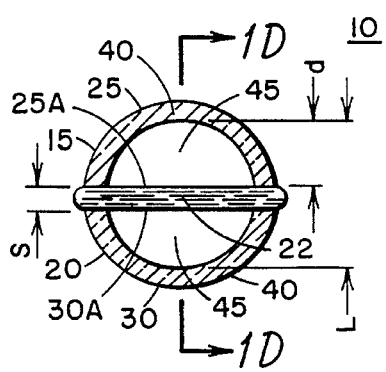
FIG. 1C is a cross section of the optical coupler of FIG. 1A taken along section line 1C—1C.

FIG. 1C shows a cross section of the periphery of optical coupler 10 of FIG. 1A, namely a slice at a plane through the circumference of transmitter portion 25, receiver portion 30 and matching fluid 22 therebetween. As seen in the assembled optical coupler 10 of FIG. 1C, cut line 50 forms a cut surface 25A which is machined to be substantially smooth.

The receiver portion 30 of receiver optical fiber member 20 is fabricated in substantially the same manner as transmitter portion 25, except that a member 20 with a receiver portion 30 having a cut, machined smooth surface 30A results as shown in FIG. 1C. Machined smooth surfaces 25A and 30A are substantially flat and smooth in this embodiment.

An index matching member or fluid 22 is situated between transmitter portion 25 and receiver portion 30. The function of index matching member 22 will be discussed in more detail later. Many index matching fluids can be used as index matching member 22 according to the particular application providing the index of refraction of the fluid is acceptable. For example, one index matching fluid which may be employed as fluid 22 is Catalog #18094 oil available from Cargille Laboratories Inc., Cedar Grove N.J. 07009. This particular index matching fluid exhibits an index of refraction of 1.6.

Figure 1D:
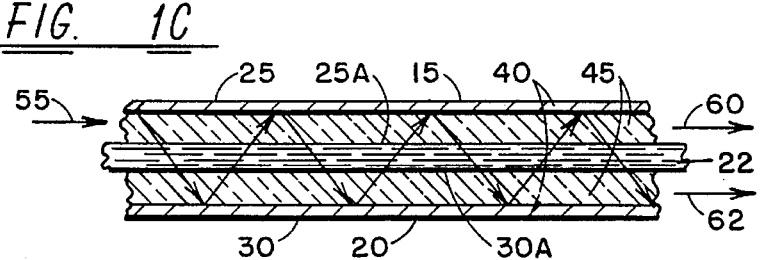
FIG. 1D is a cross section of the optical coupler of FIG. 1C taken along section line 1D—1D.

FIG. 1D is a cross section of optical coupler 10 of FIG. 1C taken along section line 1D—1D. Incident light is provided at arrow 55 to fiberoptic core 45 of transmitter Fortion 25. The remaining cladding layer 40 atop transmitter portion 25 assures that light does not vertically escape upward out of transmitter portion 25. However, since the cladding has been removed from the bottom of transmitter portion 25 at surface 25A, light controllably escapes downward through index matching fluid 22 and enters receiver portion 30. The reflection losses which are observed in this optical signal transfer from the transmitter portion to the receiver portion are desirably very low due to index matching member or fluid 22 which couples light from the transmitter portion and the receiver portion. Index matching member 22 is alternatively a transparent solid material or a liquid.

In more detail, when the optical signal enters receiver portion 30, it reflects off the lower cladding layer 40 of receiver portion 30 and propagates back toward the transmitter portion 25. The optical signal bounces between transmitter portion 25 and receiver portion 30 at an angle as shown in FIG. 1D. However, the average light propagation is along the length of the fiber core 45 of the transmitter portion and the receiver portion. The signal is thus contained by the fiber cores 45 of transmitter portion 25 and receiver portion 30. A coupling loss of approximately 50% (−3 dB) can be expected from this coupling mechanism. As shown in FIG. 1D, the optical signal is equally contained between the two fiber cores 45 of the transmitter and receiver portions as indicated by the light propagation arrows 60 and 62. However, the light output is derived only from the receiver portion 30, as indicated by output arrow 62. The signal propagating out the end of transmitter portion 25 is lost as indicated by arrow 60.

It is noted that the above described coupling mechanism can be implemented in a linear coupling device wherein the transmitter portion and receiver portion are linearly vertically aligned as well as the rotational coupling approach described above. In either case, the optical signal is contained by the transmitter portion on top and the receiver portion on the bottom. Minimum signal loss through the coupler is achieved by using the index matching member 22, for example an index matching fluid or transparent solid, between transmitter portion 25 and receiver portion 30.

In a coupler wherein the optical fiber core 45 of transmitter portion 25 exhibits an index of refraction of approximately 1.6 and optical fiber core 45 of receiver portion 30 exhibits an index of refraction of approximately 1.6, to match transmitter portion 25 to receiver portion 30, matching member 22 is selected to have the same index of refraction of approximately 1.6. The indices of refraction of optical fiber core 45 of transmitter portion 25, optical fibre core 45 of receiver portion 30 and index matching member 22 are selected to be approximately equal. Index matching member 22 effectively eliminates the discontinuity between the fiber core 45 and the atmosphere (air) such that reflection losses are reduced to a minimum. In other words, the index matching fluid or oil eliminates the plastic-air interfaces associated with the fiber of the transmitter portion and the fiber of the receiver portion so as to allow light to travel freely between the two fibers with low loss.

It is noted that the coupling mechanism of optical coupler 10 uses the fiberoptic core-cladding interface of transmitter portion 25 and the fiberoptic core-cladding interface of receiver portion 30 as mirrors for containing the optical signal transmitted therethrough. Fiberoptic cores 45 can be either stepped index or graded index and still exhibit the desired mirror effect. These curved mirrors are effectively located at the outer surfaces of the fiberoptic cores 45, namely the surfaces thereof which face cladding layers 40.

As seen in FIG. 1C, the distance between the outer surface of the fiberoptic core 45 of transmitter portion 25 and the outer surface of fiberoptic core 45 of receiver portion 30 is designated, L, namely the distance between the "mirrors". It is noted that L is measured through the lateral centers of the respective cores 45. The stability criterion for this curved mirror structure is given by the relationship:

Relationship 1

$$0 < \left(1 - \frac{L}{R_1}\right)\left(1 - \frac{L}{R_2}\right) < 1$$

wherein $R=R_1=R_2=$ the radius of curvature of the optical fiber. $R_1$ and $R_2$ are the radii of curvature of fiber cores 45 of transmitter portion 25 and receiver portion 30.

It is noted that maximum containment of the optical signal between the effective mirrors occurs when the following condition is true:

Relationship 2

$0<L<R$

From FIG. 1C it is seen that in this particular embodiment:

Relationship 3

$2d+S=L$

Inserting this relationship 3 into the stability criterion expressed in relationship 1 yields:

Relationship 4

$0<2d+S<R$

Thus, R, the radius of curvature of fiberoptic cores 45 of transmitter portion 25 and receiver portion 30 is equal to 500 µm. for a 1 mm diameter fiber. When these values are substituted in relationship 3, it is found that L<0.5 mm for this particular embodiment.

Figure 2A:
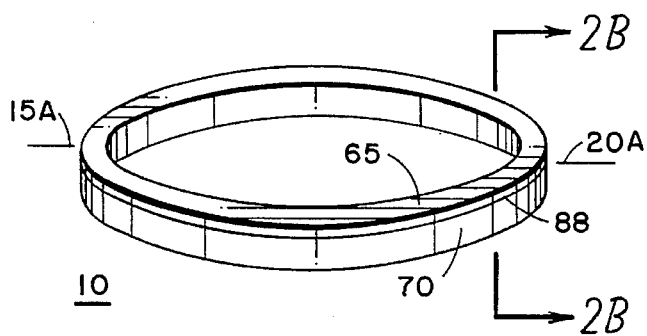
FIG. 2A is a more detailed perspective view of the optical coupler of FIG. 1A.
Figure 2B:
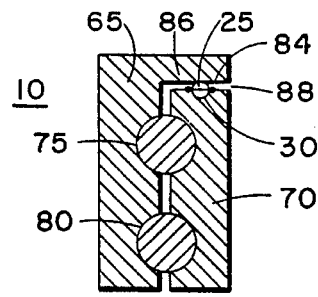
FIG. 2B is a cross section of the optical coupler of FIG. 2A taken along section line 2B—2B.

FIG. 2A depicts a more detailed perspective representation of optical coupler 10. The structure of coupler 10 is more readily appreciated from the cross section shown in FIG. 2B. FIG. 2B is a cross section of optical coupler 10 of FIG. 2A taken along section line 2B—2B. Coupler 10 includes an inner cylindrical member 65 and an outer cylindrical member 70 as shown. Inner cylindrical member 65 is substantially L-shaped in cross section. More particularly, inner cylindrical member 65 appears as an inverted L in the cross section in FIG. 2B. An upper annular ball bearing assembly 75 and a lower annular ball bearing assembly 80 are situated between inner cylindrical member 65 and outer cylindrical member 70. Ball bearing assemblies 75 and 80 permit inner cylindrical member 65 and outer cylindrical member 70 to rotate substantially freely with respect to each other.

FIG. 2C is a close-up view of the portion of coupler 10 of FIG. 2B which houses transmitter portion 25 and receiver portion 30. Most of transmitter portion 25 is situated in an annular groove 82 which is semi-circularly recessed in lower wall 84 of L leg 86 of inner cylindrical member 65. As seen in FIG. 2C, a portion of transmitter portion 25 extends downwardly into the horizontal portion of the channel 88 formed between lower wall 84 of inner cylindrical member 65 and upper wall 90 of outer cylindrical member 70. Receiver portion 30 is situated in an annular groove 92 which is semi-circularly recessed in upper wall 90 of outer cylindrical member 70.

The space, S, between transmitter portion 25 and receiver portion 30 is filled with index matching fluid 22 as described earlier. To hold index matching fluid 22 between transmitter portion 25 and receiver portion 30, an inner O-ring 93 and an outer O-ring 94 bound fluid 22 as shown. Fluid 22 is thus prevented from escaping from the space, S, between transmitter portion 25 and receiver portion 30. O-ring 93 and O-ring 94 are situated in respective annular grooves 95 and 96 in outer cylindrical member 70.

FIG. 3A shows another embodiment of the invention as optical coupler 100. Optical coupler 100 includes many elements which are similar to those of optical coupler 10 of FIG. 1A–1B. One distinction of optical coupler 100 of FIG. 3A is that optical coupler 100 includes a pliable or deformable index matching member 105 situated between transmitter optical fiber member 115 and a receiver optical fiber member 120. Index matching member 105 is fabricated from optical material, namely transparent material. Transmitter optical fiber member 115 and receiver optical fiber member 120 are similar to transmitter optical fiber member 15 and receiver optical fiber member 20 of FIG.'s 1A–1D except that fiber members 115 and 120 are formed as shown in FIG. 3B as discussed subsequently.

More particularly, fiber members 115 and 120 include transmitter and receiver portions 125 and 130, respectively, which are formed as indicated in FIG. 3B. To form transmitter portion 125 of transmitter optical fiber member 115, the portion of optical fiber member 115 which is to be used to form transmitter portion 125 is cut along center cut line 150 as shown in FIG. 3B. The lower portion 132 of the optical fiber of FIG. 3B is discarded thus leaving transmitter portion 125 remaining. Transmitter portion 125 includes cladding layer 140 and inner fiberoptic core 145. The cut surface 125A thus formed at cut line 150 is machined and polished until surface 125A is substantially smooth.

FIG. 3C is a cross section of the assembled optical coupler 100 of FIG. 3A taken along a section line 3C—3C which passes through pliable matching member 105. Pliable matching member 105 performs the same index of refraction matching function as index matching fluid 22 of optical coupler 10 of FIG. 1A. However, in optical coupler 100 all of the index matching material is confined to pliable or deformable matching member 105. In this particular embodiment, index matching member 105 spans less than the entire circumference of transmitter portion 125 and receiver portion 130.

In optical coupler 100, the receiver portion 130 of receiver optical fiber member 120 is formed in substantially the same manner as transmitter portion 125 of transmitter optical member 115 except the cut surface of the resultant receiver portion 130 is designated as surface 130A. Cut surface 130A is machined to be substantially smooth.

Pliable index matching member 105 is held between transmitter portion 125 and receiver portion 130. Matching member 105 is permitted to travel freely as transmitter portion 125 rotates while receiver portion 130 remains stationary, and vice versa. Pliable index matching member 105 is made of a transparent material such as RTV silicon rubber available from Dow Corning. Index matching member 105 is in physical and optical contact with transmitter portion 125 and receiver portion 130, specifically surfaces 125A and 130A thereof, respectively. Pliable index matching member 105 mates with, and slides with respect to, smooth surfaces 125A and 130A.

Returning now to FIG. 3A, it is seen that optical coupler 100 operates by incident light or the input optical signal being provided to transmitter portion 125 in a direction generally indicated by arrow 155. The input optical signal travels along transmitter portion 125 while being contained therein by total internal reflection due to the cladding layer 140 on the upper surface of transmitter portion 125 and the air interface formed at smooth surface 125A which is the lower surface of transmitter portion 125. This containment is disrupted by deformable index matching member 105. When the input optical signal encounters matching member 105, the optical signal is free to propagate into the receiver portion 130 therebelow. After passing through matching member 105, the optical signal enters receiver portion 130 and is contained therein by the same mechanism by which the optical signal was contained in transmitter portion 125. Deformable index matching member 105 is free to travel annularly between transmitter portion 125 and receiver portion 130 as transmitter portion 125 and receiver portion 130 rotate with respect to each other. However, propagation of the optical signal between transmitter portion 125 and receiver portion 130 is confined to the location where pliable index matching member 105 is presently located.

It is noted that in one embodiment of the invention wherein the index of refraction of the core of transmitter optical fiber member 115 is approximately 1.6 and the index of refraction of the core of receiver optical fiber member 120 is approximately 1.6, that the index of refraction of pliable index matching member 105 is also approximately 1.6. For best results, the indices of refraction of the core of transmitter optical fiber member 115, the core of receiver optical fiber member 120 and pliable index matching member 105 should match each other as closely as possible.

FIG. 4A depicts a more detailed perspective representation of optical coupler 10. The structure of coupler 100 is more readily appreciated from the cross section shown in FIG. 4B. FIG. 4B is a cross section of optical coupler 100 of FIG. 4A taken along section line 4B—4B. Coupler 100 includes an inner cylindrical member 165 and an outer cylindrical member 170 which are similar to inner cylindrical member 65 and outer cylindrical member 70 of FIG. 2B except for the subsequently discussed differences.

Inner cylindrical member 165 is substantially L-shaped in cross section. More particularly, inner cylindrical member 165 appears as an inverted L in the cross section in FIG. 4B. An upper annular ball bearing assembly 175 and a lower annular ball bearing assembly 180 are situated between inner cylindrical member 165 and an outer cylindrical member 170. Ball bearing assemblies 175 and 180 permit inner cylindrical member 165 and outer cylindrical member 170 to rotate substantially freely with respect to each other.

Figure 4C:
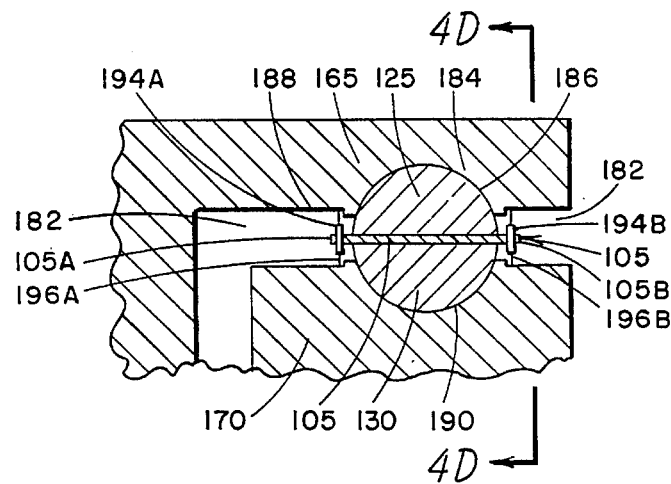
FIG. 4C is a close up view of the portion of optical coupler of FIG. 4B in which a transmitter and receiver portion are situated.

FIG. 4C is a close-up view of the portion of coupler 100 of FIG. 4B which houses transmitter portion 125 and receiver portion 130. Transmitter portion 125 and receiver portion 130 are positioned to face each other in spaced apart relationship in a channel 182 between L leg 184 and outer cylindrical member 170. More particularly, transmitter portion 125 rests in an annular groove 186 in lower wall 188 of L leg 184. Similarly, receiver portion 130 rests in channel 182 and in an annular groove 190 in the uppermost portion of outer cylindrical member 170.

Figure 4D:
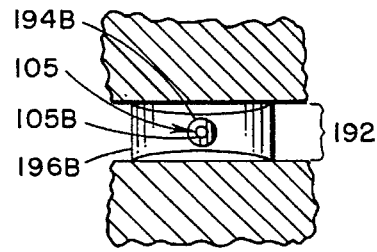
FIG. 4D is a cross section of the portion of optical coupler of FIG,. 4C taken along section line 4D—4D.

Index matching member 105 is situated between transmitter portion 125 and receiver portion 130. Index matching member 105 exhibits a cylindrical shape such that it forms a roller which can rotate as transmitter portion 125 rotates by it on the top and as receiver portion 130 rotates by it on the bottom. More particularly, index matching member 105 is mounted in a bearing assembly 192 as shown in FIG. 4D to permit index matching member 105 to rotate in the above described roller-like fashion. Index matching member 105 includes opposed ends 105A and 105B which are situated in respective bearings 194A and 194B. Bearings 194A and 194B are situated in races 196A and 196B, respectively. It is noted that in one embodiment, deformable or pliable index matching member 105 exhibits a lengthwise dimension as seen in FIG. 4C which is substantially less than the circumference of inner cylindrical member 165 and outer cylindrical member 170.

Figure 5A:
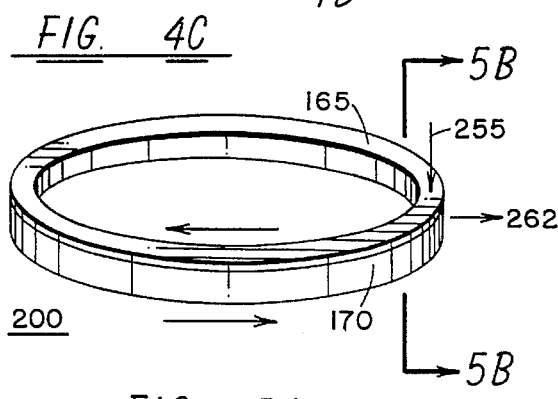
FIG. 5A is a perspective view of another embodiment of the optical coupler of the present invention.
Figure 5B:
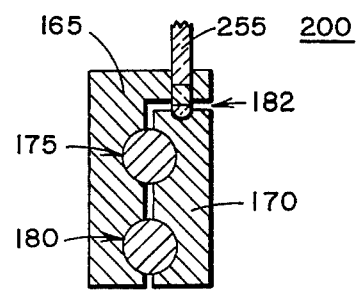
FIG. 5B is a cross section of the optical coupler of FIG. 5A taken along section line 5B—5B.

FIG. 5A shows another embodiment of the invention as optical coupler 200. Optical coupler 200 includes many elements which are similar to those of optical coupler 100 of FIG 4A–4B. Like numbers indicate like elements. FIG. 5B is a cross section of coupler 200 of FIG. 5A taken along section line 5B—5B to show ball bearings 175 and 180 which permit inner cylindrical member 165 to rotate with respect to outer cylindrical member 170.

Figure 5C:
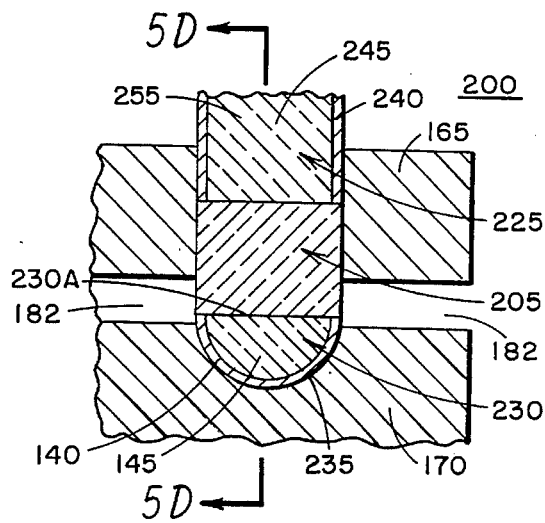
FIG. 5C is a close up view of the portion of optical coupler of FIG. 5B in which a transmitter and receiver portion are situated.

The transmitter portion of optical coupler 200 is designated as transmitter portion 225 and the receiver portion of optical coupler 200 is designated as receiver portion 230 as shown in FIG.5C. FIG. 5C is a close-up view of the portion of coupler 200 which houses transmitter portion 225 and receiver portion 230. The optical input to transmitter portion 225 is represented as input 255 and the optical output of receiver portion 230 is represented as output 262. The channel formed between inner cylindrical member 165 and outer cylindrical member 170 is again designated as channel 182.

Figure 5D:
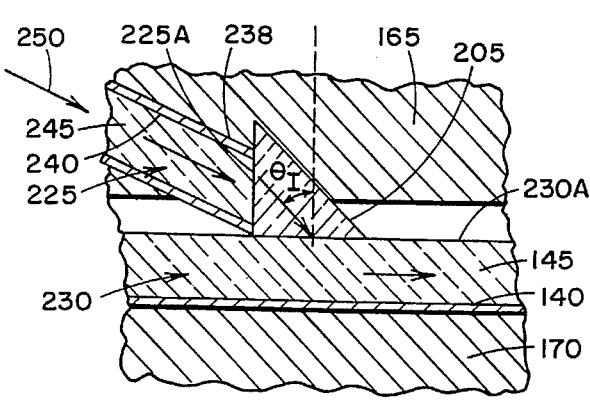
FIG. 5D is a cross section of the portion of optical coupler of FIG. 5C taken along section line 5D—5D.

FIG. 5D is a cross section of FIG. 5C taken along section line 5D—5D to more clearly show index matching member 205 which couples the optical signal from transmitter portion 225 to receiver portion 230. In this particular embodiment, index matching member 205 is a beam steering prism having approximately the same index of refraction as the optical cable which forms transmitter portion 225 and receiver portion 230. Receiver portion 230 of optical coupler 200 of FIG. 5C is fabricated by substantially the same technique used to fabricate receiver portion 130 of optical coupler 100 of FIG. 4C. Receiver portion 230 exhibits an annular geometry which is partially recessed in an annular groove 235 in outer cylindrical member 170. Index matching member 205 rides on receiver portion 230 as inner cylindrical member 165 and transmitter portion 225 rotate with respect to outer cylindrical member 170.

Transmitter portion 225 is formed by a fiber optic cable which enters inner cylindrical member 165 at input 255 (FIG. 5A 5B and 5C) and which angularly extends through a slanted hole 238 in inner cylindrical member 165 (FIG. 5D). The optical cable which forms transmitter portion 225 includes a smooth end 225A which is angularly cut to meet with a side of index matching member 205 as shown in FIG. 5D. In this manner, an optical signal provided to transmitter portion 225 is coupled to receiver portion 230 by index matching member 205 as transmitter portion 225 and inner cylindrical member 165 rotate with respect to receiver portion 230 and outer cylindrical member 170.

In this particular embodiment, transmitter portion 225 includes cladding layer 240 which surrounds an optical fiber inner core 245. Transmitter portion 225 includes optical cable end 225A which is polished to be substantially flat and smooth. In this embodiment, transmitter portion 225 is a stepped index fiber although a graded index fiber could also be employed. The receiver portion 230 includes a cladding layer 140 and an optical fiber inner core 145 like receiver portion 130 of FIG. 3C.

As also illustrated in FIG. 5D, transmitter portion 225 is terminated at end 225A in a beam steering prism 205 or other beam steering index matching member. Examples of other possible beam steering devices which may be employed as member 205 include metal or dielectric mirrors. In this particular embodiment, beam steering prism 205 is fabricated from glass.

An input optical signal is provided to transmitter portion 225 in the direction indicated by arrow 250. The optical signal exiting the transmitter portion 225 at end 225A is directed by beam steering prism 205 into receiver portion 230 as receiver portion 230 rides on receiver surface 230A. The optical signal remains within the optical fiber core 145 of receiver portion 230 due to the fiber/air interface at surface 230A and the phenomenon of total internal reflection. The angle of injection, $\Theta_I$, of the optical signal passing from prism 205 to receiver portion 230 must be less than or equal to the numerical aperture of fiber core 145 of receiver portion 230. For example, if the numerical aperture of fiber core 145 of receiver portion 130 is equal to 0.3, and the index of refraction of prism 205= 1.5, and the index of refraction of core 145=1.5, then an acceptable value of the angle of injection $\Theta_I$, would be $\geq 78.46$ degrees.

Beam steering prism 205 is in direct physical and optical contact with both end 225A of transmitter portion 225 and smooth surface 230A of receiver portion 230. Prism 205 or other beam steering device slides along surface 230A of receiver portion 130 as transmitter portion 225 moves or rotates with respect to receiver portion 230, or vice versa. It has been found that the lifetime of the sliding interface between beam steering member 205 and receiver portion surface 230A is maximized when prism 205 is made from a hard transparent material such as glass which rubs against a relatively soft transparent material, such as plastic, used for fiber core 145.

FIG. 6A shows a cross section of another embodiment of the coupler of the invention as coupler 300 in which the coupling efficiency between the transmitter portion 325 and the receiver portion 230 is increased. Coupler 300 is similar to coupler 200 of FIG. 5C except for the following modifications. The same receiver portion 230 that was employed in optical coupler 200 is employed in optical coupler 300. However, optical coupler 300 includes a transmitter portion 325 having a transmitter optical fiber member 305 including an optical fiber core 310 and a cladding layer 315. An end 305A of transmitter optical fiber member 305 is polished to be substantially smooth. End 305A is held in abutment with, and slides with respect to, the upper surface 230A of the optical fiber core 145 of receiver portion 230.

FIG. 6B is a cross section of coupler 300 of FIG. 6A taken along section line 6B—6B to more clearly show the angular relationship of transmitter fiber 325 to receiver portion 230. As seen in FIG. 6B, transmitter portion 325 rides directly on receiver portion 230. Transmitter optical fiber is situated in a slanted hole 328 such that the optical signal exiting transmitter portion and coupled to receiver portion 230 exhibits an angle of injection of $\Theta_I$ into receiver portion 230. In other words, transmitter optical fiber 305 intercepts receiver portion 230 at an angle of injection, $\Theta_I$, which is greater than or equal to the angle which will allow the injected light to be contained by the receiver portion optical fiber. In this particular embodiment, the numerical aperture of receiver portion is within the range of approximately 0.3 to approximately 0.4.

As illustrated in FIG. 6B, incident light enters transmitter optical fiber 305. The optical signal passes through transmitter optical fiber 305 and is transferred to receiver portion 230. Receiver portion 230 contains the optical signal as discussed earlier.

It is noted that the optical signal exiting transmitter optical fiber member 305 and entering receiver portion 230 is in the shape of a cone of half angle. This condition causes some of the optical signal entering receiver portion 230 to be outside of the numerical aperture of the receiver portion which results in signal L loss in the transfer of the optical signal from the transmitter optical fiber member 305 to receiver portion 230.

These losses can be reduced by inserting a collimating lens 405 between end 305A of transmitter optical fiber 305 and upper surface 410A of receiver portion 230 as shown in optical coupler 400 of FIG. 7B. Coupler 400 is similar to coupler 300 except for the differences discussed herein. One lens that can be used as collimating lens 405 is a gradient index (GRIN) lens. As shown more clearly in the cross section of FIG. 7B, an index matching prism 410 is situated between collimating lens 405 and upper surface 230A of receiver portion 230.

As a general observation, it is noted that a light ray bends at an optical interface (for e.g. air-glass, air-plastic) when the incident light angle is other than 90 degrees. Prism 410 eliminates this bending when its index equals the index of the fiber core of receiver portion 230. When the index of prism 410 is greater than the index of fiber core of receiver portion 230, then the light ray desirably bends to be more parallel with the receiver fiber.

FIG. 8A is a perspective view of a linear translation optical coupler 500 in which an upper coupler member 505 moves linearly atop a lower coupler member 510. Upper coupler member 505 is movable in the direction of motion indicated by arrow 506 and lower coupler member is movable in the direction of motion indicated by arrow 507. Arrows 506 and 506 indicate the lengthwise direction of coupler 500.

Upper coupler member 505 is substantially T-shaped and lower coupler member 510 is substantially U-shaped in this particular embodiment as shown more clearly in the cross-sectional view of FIG. 8B. FIG. 8B depicts a cross section of coupler 500 of FIG. 8A taken along section line 8B—8B. Coupler 500 is similar to coupler 400 except that coupler 500 is a linearized version of coupler 400. Upper coupler member 505 includes a central main body 505A from which opposed wing members 505B and 505C laterally extend. Lower coupler member 510 includes a central connective member 510A from which opposed side members 510B and 510C extend.

A ball bearing arrangement is employed in coupler 500 which is similar to the ball bearing arrangement of coupler 400 except that in coupler 500 two sets of ball bearings are used to provide upper coupler member 505 with freedom of movement with respect to lower coupler member 510. More particularly, ball bearings 175 and 180 are positioned between main body 505A and side member 510C is a manner similar to that depicted in FIG. 5B. In a similar fashion, ball bearings 515 and 520 are positioned between main body 505 and side member 510B. In actual practice, ball bearing set pairs 175–180, 515–520 are situated at spaced apart intervals longitudinally along the length of coupler 500. Ball bearing set pairs 175–180, 515–520 shown in FIG. 8B are illustrative of these ball bearing set pairs which are situated along the length of coupler 500.

The same optical fiber transmitter portion and optical fiber receiver portion arrangement as employed in coupler 400 of FIG. 7A–7B is used in coupler 500. For this reason, the transmitter portion and receiver portion is not discussed in detail. FIG. 7A and 7B show transmitter optical fiber 305 to which the input optical signal is provided. Reference should be made however to FIG.'s 7A and 7B for the details of the transmitter and receiver optical fiber members and the optical coupling arrangement between these members in optical coupler 500. It will be appreciated that using substantially the same structure as shown in FIG. 8A and 8B, the transmitter/receiver portion arrangements of couplers 200, 300 and 400 can be adapted for linear translational applications like that of coupler 500.

The foregoing has described an optical coupler which advantageously maintains optical continuity between input and output optical fiber members while the input and output optical fibers are moving rotationally, or alternatively, linearly. The disclosed optical coupler seeks to maximize signal transfer through the coupler while minimizing signal loss. The disclosed optical coupler further seeks to reduce friction in the moving elements of the coupler.

While only certain preferred features of the invention have been shown by way of illustration, many modifications and changes will occur to those skilled in the art. It is, therefore, to be understood that the present claims are intended to cover all such modifications and changes which fall within the true spirit of the invention.

What is claimed is:

1. An optical coupler comprising:

a transmitter optical fiber member including a generally curved upper surface and a substantially flat lower surface running lengthwise along the transmitter optical fiber member, the transmitter optical fiber member including an input end;

a first cladding layer situated on the upper surface of the transmitter optical fiber member;

a receiver optical fiber member including a generally curved lower surface and a substantially flat upper surface running lengthwise along the receiver optical fiber member, the receiver optical fiber member including an output end;

a second cladding layer situated on the lower surface of the transmitter optical fiber member, the flat surface of the receiver optical fiber member being oriented to face the flat surface of the transmitter optical fiber member in spaced apart relationship thereto; and an index matching member situated between the flat surface of the receiver optical fiber member and the flat surface of the transmitter optical fiber member to couple light from the transmitter optical fiber member to the receiver optical fiber member while permitting the transmitter optical fiber member to move with respect to the receiver optical fiber member.

2. An optical coupler comprising:

a first annular member;

a second annular member rotatably mounted to the first annular member;

a transmitter optical fiber member, coupled to the first annular member, the transmitter optical fiber member including a first cladding layer for containing an optical signal provided thereto and a substantially flat lower surface through which the optical signal passes;

a receiver optical fiber member, coupled to the second annular member, the receiver optical fiber member including a second cladding layer for containing an optical signal provided thereto and a substantially flat upper surface through which the optical signal passes;

an index matching member situated between and in slidable contact with the lower surface of the transmitter optical fiber member and the upper surface of the receiver optical fiber member, the slidable index member coupling the optical signal between the transmitter optical fiber member and the receiver optical fiber member.

3. The optical coupler of claim 2 wherein the transmitter optical fiber member and the receiver optical fiber member each exhibit a substantially annular geometry.

4. The optical coupler of claim 2 wherein the lower surface of the transmitter optical fiber member and the upper surface of the receiver optical fiber member are spaced apart to form a first region therebetween, the index matching member being situated in the first region.

5. The optical coupler of claim 3 wherein the transmitter optical fiber member and the receiver optical fiber member each exhibit a circumference and the index matching member substantially spans the circumferences of the transmitter optical fiber member and the receiver optical fiber member.

6. The optical coupler of claim 5 wherein the index matching member comprises index matching oil which is situated in the first region, the optical coupler including first and second seals for sealing the index matching oil in the first region.

7. The optical coupler of claim 6 wherein the first and second seals comprise 0-rings.

8. The optical coupler of claim 3 wherein the index matching member comprises a slidable optical coupler element exhibiting a length less than the circumference of the transmitter and receiver optical fiber members such that slidable optical coupler element slides as the transmitter optical fiber member moves with respect to the receiver optical fiber member.

9. The optical coupler of claim 8 wherein the slidable optical coupler element is fabricated from pliable, deformable optical material.

10. An optical coupler comprising:

a first annular member including opposed surfaces having an opening therethrough;

a second annular member situated below and rotatably mounted to the first annular member;

a transmitter optical fiber situated in the opening of the first annular member, the transmitter optical fiber including an end facing the second annular member below to permit an optical signal to be provided through the transmitter optical fiber to the end; and a receiver optical fiber member exhibiting an annular geometry and situated on the second annular member, the receiver optical fiber member including a substantially flat upper surface facing the end of transmitter optical fiber to receive the optical signal therefrom, the receiver optical fiber member further including a cladding layer for containing the optical signal, whereby the receiver optical fiber member receives the optical signal from the transmitter optical fiber when the transmitter optical fiber rotates with respect to the receiver optical fiber member and when the transmitter optical fiber is stationary with respect to the receiver optical fiber member.

11. The optical coupler of claim 10 further comprising an index matching prism including an optical input surface and an optical output surface, the optical input surface of the prism being in contact with the end of the transmitter optical fiber to receive an optical signal therefrom, the output surface of the prism being in sliding contact with the substantially flat upper surface of the receiver optical fiber member to steer the optical signal to the receiver optical fiber member.

12. The optical coupler of claim 10 further comprising:

a focussing lens including an optical input surface and an optical output surface, the optical input surface of the focusing lens facing the end of the transmitter optical fiber to receive an optical signal therefrom;

an index matching prism including a prism input surface and a prism output surface, the prism input surface being in contact with the optical output surface of the focussing lens, the prism output surface being in sliding contact with the substantially flat upper surface of the receiver optical fiber member to steer the optical signal to the receiver optical fiber member.

13. The optical coupler of claim 12 wherein the focusing lens comprises a GRIN lens.

14. An optical coupler comprising:

a first member;

a second member slidably mounted on the first member such that the second member can slide linearly along the first member, the second member including opposed surfaces having an opening therethrough;

a transmitter optical fiber situated in the opening of the second member, the transmitter optical fiber including an end facing the first member to permit an optical signal to be provided through the transmitter optical fiber to the end; and a receiver optical fiber member situated lengthwise along the first member, the receiver optical fiber member including a substantially flat upper surface facing the end of transmitter optical fiber to receive the optical signal therefrom, the receiver optical fiber member further including a cladding layer for containing the optical signal, whereby the receiver optical fiber member receives the optical signal from the transmitter optical fiber when the transmitter optical fiber slides linearly with respect to the receiver optical fiber member and when the transmitter optical fiber is stationary with respect to the receiver optical fiber member.

\* \* \* \* \*